United States Patent Office 3,278,372
Patented Oct. 11, 1966

3,278,372
HALONITROSALICYLANILIDE MICROBICIDE
Robert G. Taborsky, Bedford Heights, Ohio, assignor to Ben Venue Laboratories, Inc., Pittsburgh, Pa., a corporation of Pennsylvania
No Drawing. Filed July 2, 1965, Ser. No. 469,330
6 Claims. (Cl. 167—31)

This application is a continuation-in-part of applicant's co-pending applications, Serial No. 325,473, filed November 21, 1963, now abandoned, and Serial No. 435,686, filed February 26, 1965, now abandoned, both of which were continuation-in-part applications of applicant's then co-pending application, Serial No. 56,679, filed September 19, 1960, now abandoned.

This invention relates to new, substituted salicylanilides, their production and use as antimicrobials and more particularly to halonitrosalicylanilides.

The general object of this invention is to provide new substituted salicylanilides and more particularly to provide halonitrosalicylanilides.

Other objects of this invention includes providing new substituted salicylanilides which have unique and desirable antibacterial activity over prior substituted salicylanilides and are also antimycotic; which have a broad spectra of antimicrobial activity; which do not impair the antimycotic properties of the salicylanilide parent molecule; which are economically manufactured and used; which have new and increased utility for commercial application; and, which may be used in and with other substances and compounds to provide long lasting antimicrobial properties therefor and thereto.

Still further objects of this invention are to provide for the new use of halonitrosalicylanilides as antimicrobials and to provide new and improved method and means for microbial control.

Another object of this invention is to obtain one or more of the objects hereinbefore set forth.

These and other objects and advantages of this invention will become apparent from the following description of preferred forms thereof.

Broadly, the substituted salicylanilides which are used in this invention correspond to the following formula:

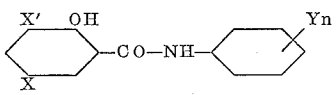

wherein X and X' are chosen from the group consisting of $NO_2$ and H with at least one of X and X' consisting of $NO_2$, Y is a halogen and $n$ is an integer no greater than 5.

The following are specific examples of halonitrosalicylanilides used in the embodiments of this invention and having corrected melting points in degrees centigrade as listed, Table I

| Compound | M.P.,° C.* | Formula |
|---|---|---|
| 4'-fluoro-3-nitrosalicylanilide | 141.5–142 | $C_{13}H_9FN_2O_4$ |
| 2'-chloro-3-nitrosalicylanilide | 171.5–172.5 | $C_{13}H_9ClN_2O_4$ |
| 3'-chloro-3-nitrosalicylanilide | 152.5–153.5 | $C_{13}H_9ClN_2O_4$ |
| 4'-chloro-3-nitrosalicylanilide | 154–156 | $C_{13}H_9ClN_2O_4$ |
| 4'-bromo-3-nitrosalicylanilide | 158–158.5 | $C_{13}H_9BrN_2O_4$ |
| 4'-iodo-3-nitrosalicylanilide | 175–178 | $C_{13}H_9IN_2O_4$ |
| 2',4'-dichloro-3-nitrosalicylanilide | 241 | $C_{13}H_8Cl_2N_2O_4$ |
| 4'-fluoro-5-nitrosalicylanilide | 240 | $C_{13}H_9FN_2O_4$ |
| 2'-chloro-5-nitrosalicylanilide | 200–203 | $C_{13}H_9ClN_2O_4$ |
| 3'-chloro-5-nitrosalicylanilide | 230 | $C_{13}H_9ClN_2O_4$ |
| 4'-chloro-5-nitrosalicylanilide | 252.5 | $C_{13}H_9ClN_2O_4$ |
| 4'-bromo-5-nitrosalicylanilide | 242–245 | $C_{13}H_9BrN_2O_4$ |
| 4'-iodo-5-nitrosalicylanilide | 261–264 | $C_{13}H_9IN_2O_4$ |
| 2',4'-dichloro-5-nitrosalicylanilide | 261–262 | $C_{13}H_8Cl_2N_2O_4$ |
| 2',4',6'-trichloro-5-nitrosalicylanilide | 233.5–234 | $C_{13}H_7Cl_3N_2O_4$ |
| 2'chloro-3,5-dinitrosalicylanilide | 216.5–218 | $C_{13}H_8ClN_3O_6$ |
| 3'-chloro-3,5-dinitrosalicylanilide | 211–212 | $C_{13}H_8ClN_3O_6$ |
| 4'-bromo-3,5-dinitrosalicylanilide | 227 | $C_{13}H_8BrN_3O_6$ |

*Corrected.

Halonitrosalicylanilides used in this invention may be produced, for example, by either of methods. In one method the dinitro or nitrosalicylcoyl chloride is reacted with an excess of the halogenated aniline (see Examples III through XX, inclusive, below) in benzene and recrystallized to give satisfactory yields of from 71 to 93 percent of the respective halonitrosalicylanilides. For example, 5 nitrosalicoyl chloride plus parachloroaniline gives 4'-chloro-5-nitrosalicylanilide plus HCl.

The second method broadly comprises reacting the acid, the aniline and phosphorus trichloride in benzene.

For both methods 3- and 5-nitrosalicylic acids are conveniently prepared in a conventional manner by a low temperautre (0°) nitration of salicylic acid and yield an isomeric mixture of about 3:1 of the 5- and 3-nitro acids. Separation is effected by taking advantage of the difference in solubility of the potassium salts of these acids.

More particularly 3- and 5-nitrosalicyclic acids for preparing the halonitrosalicylanilides used in this invention are conveniently prepared in accordance with the following example.

EXAMPLE I

Two thousand grams (14.5 mole) of salicylic acid were dissolved in 4 liters of concentrated sulfuric acid and the solution cooled with Dry Ice-alcohol to 0°. Then with rapid stirring and continued cooling, a precooled mixture of 916 milliliters of concentrated nitric acid (specific gravity 1.40) and 916 milliliters of concentrated sulfuric acid was added over a period of about one hour while keeping the temperature below 7°. The mixture was then poured into 24 liters of water, allowed to stand overnight, filtered by vacuum, washed, and dried at 70° for sixteen hours. A yield of 2,550 grams (96.0% yield) of the cream colored isomeric mixture was obtained.

In order to separate the respective 3 and 5 nitro salicylic acids, one hundred and sixty-three grams (0.89 mole) of the isomeric mixture were dissolved, with stirring, in 3,300 milliliters of boiling water containing 114.0 grams of potassium carbonate and 15 grams of charcoal. The hot solution was filtered and allowed to stand at room temperature overnight. The orange crystals of the potassium salt of 3-nitrosalicylic acid precipitated out while the solution stood and were filtered by vacuum and washed three times with cold water. They were then dissolved in one liter of 90° water, the solution filtered, and 60 milliliters of 35.0% sulfuric acid added to the hot filtrate with vigorous stirring to give an immediate precipitate of 3-nitrosalicylic acid. The solution was then stirred and cooled to room temperature and a white solid separated which was removed by vacuum filtration and washed with water. The product was dried at 100° for sixteen hours to give 37.5 grams (22.5% yield) of 3-nitrosalicylic acid, M.P. 147.5–148°, which now had a canary yellow color. The original filtrate was then acidified and its volume reduced to one-fifth and 90 grams (55.0% yield) of 5-nitrosalicylic acid were obtained upon filtering, washing and drying.

PREPARATION OF HALONITROSALICYL-ANILIDES

The examples below represent the preferred first method identified above for preparing halonitrosalicylanilides useful in this invention.

EXAMPLE II

A solution of 25 grams (0.12 mole) of 3-nitrosalicoyl chloride in 200 milliliters of benzene was added with shaking to 50 grams (0.39 mole) of para-chloroaniline in 150 milliliters of benzene. An immediate yellow precipitate formed which was allowed to stand overnight and then vacuum filtered. The solid obtained was washed with small amounts of benzene, air dried, pulverized, and then stirred for thirty minutes in 100 milliliters of 10% hydrochloric acid. The product was then vacuum filtered again, washed well with water, and dried at 90° for sixteen hours to give 28.5 grams (78.5% yield) of crude 4'-chloro-3-nitrosalicylanilide, having a melting point of 153–156° C. The crude 4'-chloro-3-nitrosalicylanilide was crystallized from 600 milliliters of ethanol to give 23.0 grams of yellow needles in a first crop and additional 3.6 grams by reducing the alcohol filtrate to one-sixth, or a total of 26.6 grams of 4'-chloro-3-nitrosalicylanilide having a melting point of 154–156° C.

The other halonitrosalicylanilides provided by this invention, when prepared in accordance with the procedure of this example, were obtained in molar yields of from 71 to 93 percent.

EXAMPLE III

Similarly, 5.0 grams (0.025 mole) of 3-nitrosalicoyl chloride were reacted with 9.2 grams (0.083 mole) of para-fluoroaniline for eighteen hours in benzene to give 4'-fluoro-3-nitrosalicylanilide having a melting point of 141.5–142° upon crystallization from ethanol.

EXAMPLES IV

Similarly, 5.0 grams (0.025 mole) of 3-nitrosalicoyl chloride were reacted with 10.6 grams (0.083 mole) of orthochloroaniline in benzene to give 2'-chloro-3-nitrosalicylanilide, having a melting point of 171.5–172.5° upon crystallization from ethanol.

EXAMPLE V

Similarly, 5.0 grams (0.025 mole) of 3-nitrosalicoyl chloride were reacted with 10.6 grams (0.083 mole) of metachloroaniline in benzene to give 3'-chloro-3-nitrosalicylanilide, having a melting point of 152.5–153.5° upon crystallization from ethanol.

EXAMPLE VI

Similarly, 5.0 grams (0.025 mole) of 3-nitrosalicoyl chloride and 14.3 grams (0.083 mole) of para-bromoaniline were reacted in benzene for eighteen hours to give 4'-bromo-3-nitrosalicylanilide, having a melting point of 158–158.5° upon crystallization from ethanol.

EXAMPLE VII

Similarly, 5.0 grams (0.025 mole) of 3-nitrosalicoyl chloride were reacted with 18.2 grams (0.083 mole) of para-iodoaniline in benzene for eighteen hours to give 4'-iodo-3-nitrosalicylanilide, having a melting point of 175–178° upon crystallization from ethanol.

EXAMPLE VIII

Similarly, 5.0 grams (0.025 mole) of 3-nitrosalicoyl chloride were reacted with 13.4 grams (0.083 mole) of 2,4-dichloroaniline for eighteen hours in benzene to give 2',4'-dichloro-3-nitrosalicylanilide, having a melting point of 241°.

EXAMPLE IX

Similarly, 5.0 grams (0.025 mole) of 5-nitrosalicoyl chloride was reacted with 9.2 grams (0.083 mole) of para-fluoroaniline in benzene for eighteen hours to give 4'-fluoro-5-nitrosalicylanilide, having a melting point of 240°, upon crystallization from a mixture of dimethylformamide and ethanol.

EXAMPLE X

Similarly, 5.0 grams (0.025 mole) of 5-nitrosalicoyl chloride were reacted with 10.6 grams (0.083 mole) of orthochloroaniline in benzene for eighteen hours to give 2'-chloro-5-nitrosalicylanilide, having a melting point of 200–203° upon crystallization from a mixture of dimethylformamide and ethanol.

EXAMPLE XI

Similarly, 5.0 grams (0.025 mole) of 5-nitrosalicoyl chloride were reacted with 10.6 grams (0.083 mole) of metachloroaniline in benzene for eighteen hours to give 3'-chloro-5-nitrosalicylanilide, having a melting point of 230° upon crystallization from a mixture of dimethylformamide and ethanol.

EXAMPLE XII

Similarly, 5.0 grams (0.025 mole) of 5-nitrosalicoyl chloride were reacted with 10.6 grams (0.083 mole) of para-chloroaniline in benzene for eighteen hours to give 4'-chloro-5-nitrosalicylanilide, having a melting point of 252.5° upon crystallization from a mixture of dimethylformamide and ethanol.

EXAMPLE XIII

Similarly, 5.0 grams (0.025 mole) of 5-nitrosalicoyl chloride and 14.3 grams (0.083 mole) of para-bromoaniline were reacted in benzene for eighteen hours to give 4'-bromo-5-nitrosalicylanilide, having a melting point of 242–245° upon crystallization from a mixture of dimethylformamide and ethanol.

EXAMPLE XIV

Similarly, 5.0 grams (0.025 mole) of 5-nitrosalicoyl chloride were reacted with 18.2 grams (0.083 mole) of para-iodoaniline in benzene for eighteen hours to give 4'-iodo-5-nitrosalicylanilide, having a melting point of 261–264° upon crystallization from a mixture of dimethylformamide and ethanol.

EXAMPLE XV

Similarly, 5.0 grams (0.025 mole) of 5-nitrosalicoyl chloride were reacted with 13.4 grams (0.083 mole) of 2,4-dichloroaniline for eighteen hours in benzene to give 2',4'-dichloro-5-nitrosalicylanilide, having a melting point of 261–262° upon crystallization from a mixture of dimethylformamide and ethanol.

EXAMPLE XVII

Similarly, 5.0 grams (0.025 mole) of 5-nitrosalicoyl chloride were reacted with 16.3 grams (0.083 mole) of 2,4,6-trichloroaniline for seven days in benzene to give 2',4',6'-trichloro-5-nitrosalicylanilide, having a melting point of 233.5–234° upon crystallization from a mixture of dimethylformamide and ethanol.

EXAMPLE XVIII

Similarly, 5.0 grams (0.02 mole) of 3,5-dinitrosalicoyl chloride were reacted with 8.4 grams (0.066 mole) of ortho-chloroaniline for eighteen hours in benzene to give 2'-chloro-3,5-dinitrosalicylanilide, having a melting point of 216.5–218° upon crystallization from ethanol.

EXAMPLE XIX

Similarly, 5.0 grams (0.02 mole) of 3,5-dinitrosalicoyl chloride were reacted with 8.4 grams (0.066 mole) of meta-chloroaniline in benzene for eighteen hours to give 3'-chloro-3,5-dinitrosalicylanilide, having a melting point of 211–212° upon crystallization from ethanol.

EXAMPLE XX

Similarly, 5.0 grams (0.02 mole) of 3,5-dinitrosalicoyl chloride and 11.4 grams (0.066 mole) of para-bromoaniline were reacted for eighteen hours in benzene to give 4'-bromo-3,5-dinitrosalicylanilide, having a melting point of 227° upon crystallization from ethanol.

When 2,4-dichloroaniline reacted with the nitrosalicoyl chlorides, the rate of reaction was slower than with the monohaloanilines and precipitate did not start form until about one hour after mixing and did not fill the mixture until several hours later. With the monohaloanilines, precipitation occurred immediately and satisfactory yields were obtained in about one hour after mixing.

With 2,4,6-trichloroaniline and 3-nitrosalicoyl chloride, the salicylanilide did not form until after five days and with 5-nitrosalicoyl chloride and the trichloroaniline the salicylanilide was obtained after seven days' standing. The halo-3-nitro and halo-3,5-dinitrosalicylanilides were crystallized from ethanol, while the halo-5-nitrosalicylanilides were crystallized from ethanol or ethanol-dimethylformamide.

As noted above, the halonitrosalicylanilides provided by this invention are preferably and advantageously prepared by one of two processes. The following examples are illustrative of their preparation by the second process hereinbefore identified.

EXAMPLE XXI

Four grams (0.022 mole) of 5-nitrosalicylic acid and 6 grams (0.047 mole) of para-chloroaniline were ground, intimately mixed, and placed into 35 milliliters of benzene containing 1.5 milliliters of phosphorus trichloride. The mixture was refluxed for sixteen hours, cooled, and filtered. The solid was crushed and suspended in 10% hydrochloric acid, filtered, and crystallized from ethanol to give 5.4 grams (83.1% yield) of 4'-chloro-5-nitrosalicylanilide, having a melting point of 249–250°. Upon admixture with 4'-chloro-5-nitrosalicylanilide prepared from the acid chloride (melting point 252.5°) no depression of melting point occurred.

EXAMPLE XXII

One hundred and seventy-two grams (1.35 mole) of para-chloroaniline together with 250.0 grams (1.36 mole) of an isomeric mixture of 3- and 5-nitrosalicylic acids, prepared as set forth in Example I above, 95.0 milliliters of phosphorus trichloride and 750 milliliters of benzene were refluxed for eighteen hours. The mixture was cooled and filtered. The filter case was then dried, ground and stirred with one liter of 10% hydrochloric acid for one hour and filtered again and the filter cake air dried to give 360 grams (91.2% molar yield) of a crude isomeric mixture of 4'-chloro-3- and 5-nitrosalicylanilides which possessed a high degree of antimicrobial activity.

ANTIMICROBIAL SCREENING

All of the halonitrosalicylanilides identified in the table set forth above were screened for antibacterial activity against *Staphylococcus aureus*, *Bacillus subtilis* and *Escherichia coli*. The screening was done with aqueous solutions made by dissolving with warming up to several hundred milligrams of the respective halonitrosalicylanilides in 100 milliliters of water containing an equivalent or a slight excess of sodium hydroxide, to give solutions of pH 7 to 8 and tested by the agar-cup method. The halonitrosalicylanilide solutions were placed in the cups and the agar seeded with the said organisms respectively. The appearance of a cleared zone surrounding the cup indicated the sensity of the organism to the compound.

The halo-3-nitro and halo-5-nitrosalicylanilide evidenced potent antimicrobial activity in these tests while the halo-3,5-dinitrosalicylanilides had little or no antimicrobial activity against the test organisms. The tests also established that all of the halo-3-nitrosalicylanilides have very similar potencies and specificities of action regardless of the number, kind, or position of the halogens in the aniline ring. This is also true for the halo-5-nitrosalicylanilides.

Likewise, all of the halonitrosalicylanilides provided by this invention were screened against the fungi, *Trichophyton mentagrophytes*, *Candida albicans*, *Penicillium luteum* and *Epidermophyton fluccosum* by incorporating various concentrations of the halonitrosalicylanilides into the media upon which the fungi were grown in glass plates.

This was done by inoculating the test organisms into a medium composed of a base of plain agar containing the test compound overlaid by a layer of potato dextrose agar. From periodic measurements of the radii of the colonies, the inverse of the radial growth rate in millimeters per day was considered an index of the fungistatic efficacy of the test substance.

A greater diversity of action is exhibited by the halonitrosalicylanilides against fungi than against the bacteria. The 3,5-dinitrosalicylanilides again showed none or very little antimicrobial action. In these tests, 4'-chloro-3-nitrosalicylanilide showed decidedly more inhibiting activity than 4'-chloro-5-nitrosalicylanilide against (*Trichophytonmentagrophytes*, *Candida albicans*, and *Penicillium luteum*). From general comparison tests carried out against these organisms, 4'-chloro-3-nitrosalicylanilide and 3'-chloro-3-nitrosalicylanilide exhibited considerably greater potencies against the above fungi than any of the other compounds. Inhibition tests at 286 parts per million in agar were carried out. At this level the 3'-chloro and 4'-chloro-3-nitrosalicylanilides inhibited all growth of the *Trichophyton mentagrophytes* at fourteen days. However, for *Penicillium luteum* although complete inhibition was not obtained, these compounds caused the lowest radial growth rate. Further tests with 3'-chloro-3-nitrosalicylanilide showed it inhibited completely *Epidermophyton fluccosum* at 7.1 parts per million at twenty-five days. Upon comparing 4'-chloro-3-nitrosalicylanilide and salidylanilide in a twenty-seven-day serial dilution test against *Candida albicans*, both materials gave similar inhibition threshold values at 45 parts per million.

As representative compounds of their respective groups 4'-chloro-3-nitrosalicylanilide and 4'-chloro-5-nitrosalicylanilide were tested further with the following results.

*Table II.—Antibacterial activities*

[Bacterial inhibition threshold concentrations, mcg./cc.]

| Compound | S. aureaus a | B. subtilis b | E. coli c |
|---|---|---|---|
| 5-nitrosalicylic acid | d 500 | | |
| 3,5 dinitrosalicyclic acid | 500 | | |
| 4-chloroaniline hydrochloride | 500 | | |
| 2,4 dichloroaniline hydrochloride | d 500 | | |
| Salicylanilide | d 1,000 | d 1,000 | d 1,000 |
| 4'-chlorosalicylanilide | 10 | | |
| 3-nitrosalicylanilide | 10 | | |
| 4'-chloro-3-nitrosalicylanilide | 1 | 1 | d 1,000 |
| 4'-chloro-5-nitrosalicylanilide | 1 | 0.3 | d 1,000 | a Micrococcus pyogenes, var. aureus.
b Bacillus subtilis.
c Escherichia coli.
d No inhibition.

Both the nitro and halogen groups confer antibacterial activity on the parent salicylanilide molecule, which alone has little, if any, antibacterial action. Further the antibacterial (antimicrobial) activity of the new halo-3-nitro and 5-nitro-salicylanilide is much greater than and not merely the additive result of the antibacterial (antimicrobial) activity of the halogenated anilines and nitrosalicyllic acids, per se. 4'-chloro 3-nitro and 5-nitro salicylanilide were tested quantitatively with the following results.

*Table III.—Quantitative antimicrobial determinations (minimum concentration to produce inhibition studies)*

ANTIFUNGAL IN VITRO TEST RESULTS (BROTH DILUTION)

[4'-chloro-3-nitrosalicylanilide]

| | Complete | Inhibition, μg./ml., Partial | None |
|---|---|---|---|
| B. dermatitidis | 200 | 200 | 100 |
| C. albicans | 100 | | 50 |
| C. neoformans | 25 | 12.5 | 6.25 |
| H. capsulatum (yeast phase) | 100 | 50 | 25 |
| N. asteroides | 3.13 | | 1.56 |
| T. interdigitale | 6.25 | 3.13 | 1.56 |

ANTIBACTERIAL IN VITRO TEST RESULTS (BROTH DILUTION)

Turbidimetric 50% inhibition, μg./ml.:

```
A. aerogenes ---------------------------------------- 20
A. tumefaciens ------------------------------------ 0.83
B. firmus ------------------------------------------ 0.71
E. coli (2 strains) -------------------------------- 12-20
K. pneumoniae (3 strains) -------------------------- 8-10
P. vulgaris (2 strains) ---------------------------- 14-20
S. schottmuelleri ---------------------------------- 16
S typhimurium -------------------------------------- 19
S. typhosa ----------------------------------------- 20
S. paradysenteriae --------------------------------- 10
S. sonnei ------------------------------------------ 20
S. aureus (4 strains) ------------------------- 0.35-3.7
S. infrequens -------------------------------------- 9.7
V. comma ------------------------------------------- 1.8
```

ANTIFUNGAL IN VITRO TEST RESULTS (BROTH DILUTION)
[4'-bromo-5-nitrosalicylanilide]

| | Complete | Inhibition, μg./ml., Partial | None |
|---|---|---|---|
| B. dermatitidis | 6.25 | 3.13 | 1.56 |
| C. albicans | 200 | | 100 |
| C. neoformans | 3.13 | | 1.56 |
| H. capsulatum (yeast phase) | 6.25 | | 3.13 |
| N. asteroides | 1.56 | | 1.56 |
| T. interdigitale | 3.13 | 1.56 | 1.56 |

ANTIBACTERIAL IN VITRO TEST RESULTS (BROTH DILUTION)
[4'-bromo-5-nitrosalicylanilide]

Turbidimetric 50% inhibition, μg./ml.:
- A. aerogenes ------------------------------------- 15
- A. tumefaciens ----------------------------------- 1.1
- B. firmus ---------------------------------------- 1.1
- E. coli (2 strains) ------------------------------ 3.8
- K. pneumoniae (3 strains) ------------------------ 3.3
- P. vulgaris (2 strains) -------------------------- 7.3
- S. schottmuelleri -------------------------------- 14
- S. typhimurium ----------------------------------- 10
- S. typhosa --------------------------------------- 13
- S. paradysenteriae ------------------------------- 5
- S. sonnei ---------------------------------------- 16
- S. aureus (4 strains) ---------------------------- 0.68–1.1
- S. infrequens ------------------------------------ 2.1
- V. comma ----------------------------------------- 1.5

Broth dilutions were prepared by incorporating appropriate graded amounts of the compounds in Difco Yeast Beef Broth which was maintained at a uniform concentration throughout each series. The tubes of the various series were inoculated with a loopful of inoculum from twenty-four hour cultures of the test organisms grown in the same medium. Incubation for forty-eight to seventy-two hours was usually sufficient although all were observed during a period of one week.

4'-chloro-3-nitrosalicylanilide also showed a threshold inhibition at 18 mcg./cc. against *Micrococcus flavus* and 4'-chloro-5-nitrosalicylanilide showed inhibition at 10 mcg./cc. against *Alcaligenes faecalis*.

Thus the halo-5-nitrosalicylanilides are more potent than the halo-3-nitrosalicylanilides and both are active against Gram-positive and Gram-negative bacteria.

Also, while the nitro and halogen substituents confer antibacterial properties upon the parent salicylanilide molecule, they neither enhance nor lower its already high antifungal activity.

Other test results with respect to the comparative antimicrobial activity of the halonitrosalicylanilides provided by this invention are as follows:

*Table IV.—In vitro bactericidal activity of a group of substituted halonitrosalicylanilides*[a]

| Compound | I[b] | II[c] | III[d] | IV[e] |
|---|---|---|---|---|
| 3'-chloro-5-nitrosalicylanilide | 5.2–10 | 300 | 30–40 | 100 |
| 2'-chloro-5-nitrosalicylanilide | 20–25 | 300 | 10–15 | 100 |
| 4'-iodo-5-nitrosalicylanilide | 3.4–5.2 | 300 | 10 | |
| 4'-bromo-5-nitrosalicylanilide | 5–10 | | 10–15 | |
| 4'-fluoro-5-nitrosalicylanilide | 10 | 200–300 | 5.2–10 | 100 |
| 2',4'-dichloro-3-nitrosalicylanilide | 40–50 | 300 | 70 | 100 |
| 4'-fluoro-3-nitrosalicylanilide | 60 | | | 100 |
| 2'-chloro-3-nitrosalicylanilide | 5.2–10 | | | 100 |
| 3'-chloro-3-nitrosalicylanilide | 60 | 300 | 70 | 100 |
| 4'-chloro-3-nitrosalicylanilide | 20–25 | | 70 | |
| 4'-bromo-3-nitrosalicylanilide | 20–25 | | 15–20 | 100 |
| 4'-chloro-5-nitrosalicylanilide | 5.2–10 | 300 | 30–40 | 100 |
| 3 parts 4'-chloro-5-nitrosalicylanilide=1 part 4'-chloro-3-nitrosalicylanilide x | 10 | 300 | 50–60 | 50–60 |
| 2',4'-dichloro-5-nitrosalicylanilide | 10 | 300 | 10–15 | 100 |

[a] Tube dilutions were plated on nutrient agar following 72 hrs. incubation at 37° C., and bacterial activity is expressed as the lowest concentration (μg./ml.) which completely antagonizes a specific test organism.
[b] *Staphylococcus aureus*. (MGH #1) expressed as μg./ml. (Penicillin resistant strain of *Staphylococcus aureus* obtained from Metropolitan General Hospital, Cleveland, Ohio).
[c] *Escherichia coli* (ATCC 10740), expressed as μg./ml.
[d] *Bacillus Subtilis* var. *globigii*, expressed as μg./ml.
[e] *Aspergillus Niger*, expressed as μg./ml. (Plate-agar dilution assay.)

Modifications, changes and improvements to the preferred forms and embodiments of the invention herein depicted and described may occur to those skilled in the art who come to understand the precepts and principles thereof. Accordingly, the patent to be issued hereon should not be limited in its scope to the specific embodiments of the invention herein depicted and described, but by the advance by which the invention has promoted the art.

I claim:

1. The method of controlling microbes comprising treating the habitat of and containing the microbe to be controlled with a microbicidal amount of a halonitrosalicylanilide having the formula

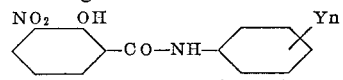

wherein Y is a halogen and $n$ is an integer no greater than 5.

2. The method of controlling microbes comprising treating the habitat of and containing the microbes to be controlled with a microbicidal amount of a halonitrosalicylanilide having the formula

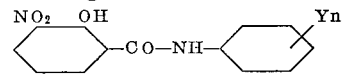

wherein Y is a halogen and $n$ is an integer no greater than 3.

3. The method of controlling microbes comprising treating the habitat of and containing the microbes to be controlled with a microbicidal amount of a halonitrosalicylanilide having the formula

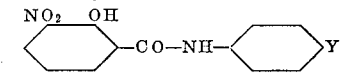

wherein Y is a halogen.

4. The method of controlling microbes comprising treating the habitat of and containing the microbes to be controlled with a microbicidal amount of a halonitrosalicylanilide having the formula

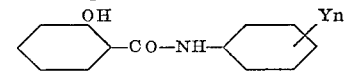

wherein Y is a halogen and $n$ is an integer no greater than 5.

5. The method of controlling microbes comprising treating the habitat of and containing the microbes to be controlled with a microbicidal amount of a halonitrosalicylanilide having the formula

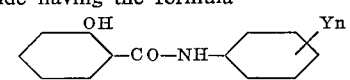

wherein Y is a halogen and $n$ is an integer no greater than 3.

6. The method of controlling microbes comprising treating the habitat of and containing the microbes to be controlled with a microbicidal amount of a halonitrosalicylanilide having the formula

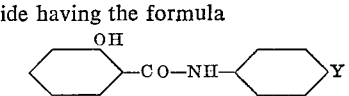

wherein Y is a halogen.

References Cited by the Examiner
UNITED STATES PATENTS 3,079,397 2/1963 Schraufstatter et al. __ 260—559
3,113,067 12/1963 Strufe et al. _____ 260—559

OTHER REFERENCES

Chemical Abstracts 51–10642f (1957).
Chemical Abstracts, formula index, volume 51, page 250F, $Cl_3H_9ClN_2O_4$ (1957).

JULIAN S. LEVITT, *Primary Examiner.*

JEROME D. GOLDBERG, *Assistant Examiner.*